(12) United States Patent
Koschany et al.

(10) Patent No.: US 6,475,656 B1
(45) Date of Patent: Nov. 5, 2002

(54) MEMBRANE-ELECTRODE UNIT WITH AN INTEGRATED WEAR RING, AND METHOD OF MAKING THE SAME

(75) Inventors: Arthur Koschany, Pocking; Thomas Schwesinger, Kirchroth, both of (DE)

(73) Assignee: Proton Motor Fuel Cell GmbH, Starnberg (DE)

( * ) Notice: Subject to any disclaimer, the term of this patent is extended or adjusted under 35 U.S.C. 154(b) by 0 days.

(21) Appl. No.: 09/355,283

(22) PCT Filed: Jan. 29, 1998

(86) PCT No.: PCT/EP98/00479

§ 371 (c)(1),
(2), (4) Date: Jul. 28, 1999

(87) PCT Pub. No.: WO98/33225

PCT Pub. Date: Jul. 30, 1998

(30) Foreign Application Priority Data

Jan. 29, 1997 (DE) .......................................... 197 03 214

(51) Int. Cl.[7] .......................... H01M 8/10; H01M 8/04; H01M 4/86; H01M 4/88
(52) U.S. Cl. ........................... 429/30; 429/35; 429/36; 429/38; 429/40; 427/115
(58) Field of Search .............................. 429/30, 35, 36, 429/40, 38; 427/115; 29/623.5

(56) References Cited

U.S. PATENT DOCUMENTS

| | | | | |
|---|---|---|---|---|
| 4,604,331 A | | 8/1986 | Louis | 429/35 |
| 5,264,299 A | * | 11/1993 | Krasij et al. | 429/30 |
| 5,523,175 A | * | 6/1996 | Beal et al. | 429/30 |
| 6,057,054 A | * | 5/2000 | Barton et al. | 429/42 |

FOREIGN PATENT DOCUMENTS

| | | |
|---|---|---|
| DE | 1596016 | 6/1971 |
| DE | 24 46 715 A1 | 4/1976 |
| DE | 36 38 856 C2 | 7/1987 |
| DE | 37 19525 | 3/1988 |
| DE | 43 14 745 | 12/1994 |
| DE | 44 42 285 | 2/1996 |
| EP | 0 331 128 | 9/1989 |
| EP | 0 504 752 A1 | 9/1992 |
| EP | 0 604 683 A1 | 7/1994 |
| EP | 0 690 519 A1 | 1/1996 |
| GB | 2 236 012 A | 3/1991 |
| JP | 0 105 2383 | 2/1989 |
| JP | 06096783 A | 4/1994 |
| WO | WO 92/22096 | 12/1992 |

* cited by examiner

Primary Examiner—Gabrielle Brouillette
Assistant Examiner—Jonathan Crepeau
(74) Attorney, Agent, or Firm—Venable; Robert Kinberg; Catherine M. Voorhees

(57) ABSTRACT

A membrane-electrode unit (1) with integrated sealing edge for a polymer electrolyte membrane fuel cell having a polymer electrolyte membrane (2), an anode (3) arranged on one surface of the membrane and a cathode (4) arranged on the other surface of the membrane, is made from a layer material of anode material, cathode material and polymer electrolyte membrane material disposed therebetween, from which pieces of suitable size are severed, with the membrane, in the severed pieces, being covered completely by the electrodes on both of its sides. On the periphery of said piece, a sealing edge (5) is formed such that the sealing edge (5) penetrates an edge portion (6', 7') of at least one of the electrodes (3, 4) and adheres to the membrane portion adjacent the edge potion and/or the sealing edge adheres to the end faces of at least one of the electrodes and the end faces of the membrane.

36 Claims, 4 Drawing Sheets

PRIOR ART

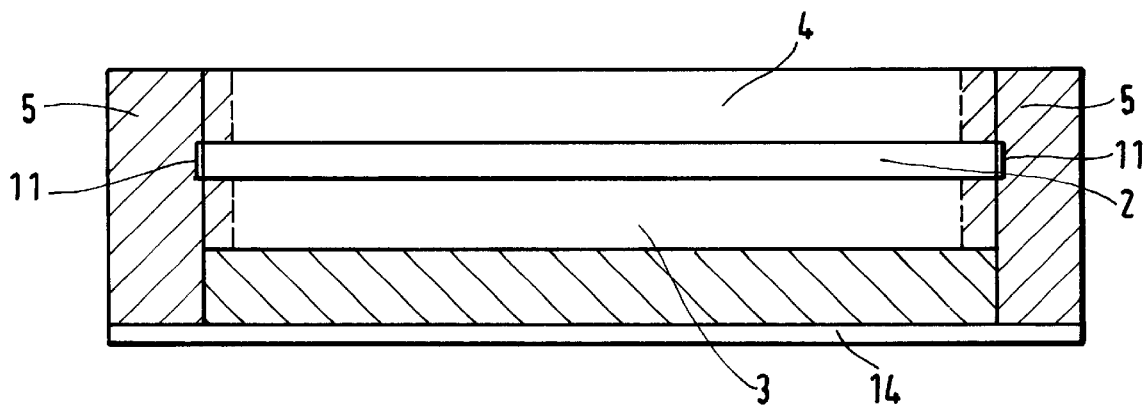
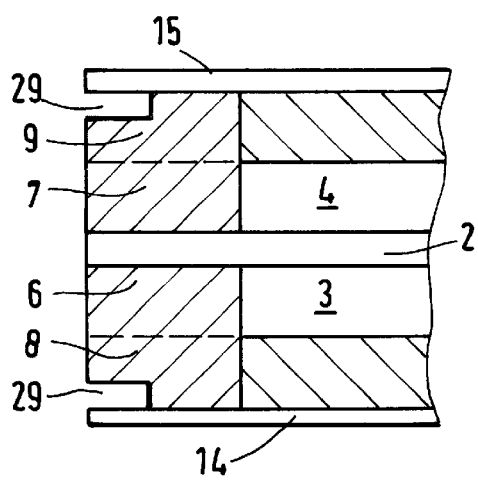 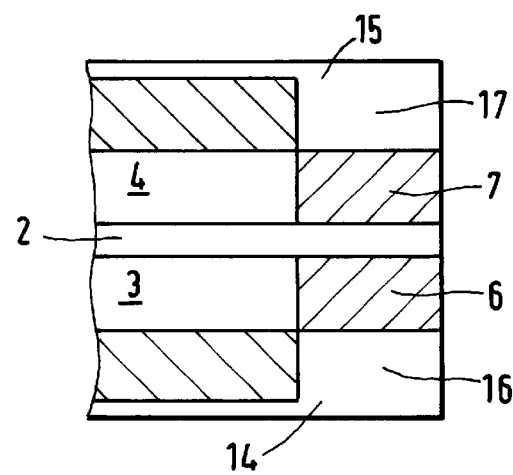
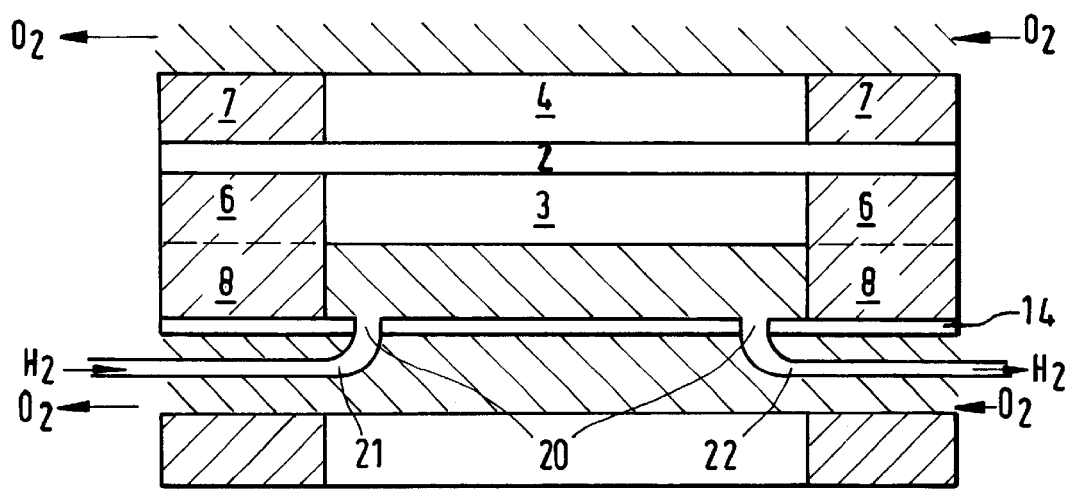

FIG.10
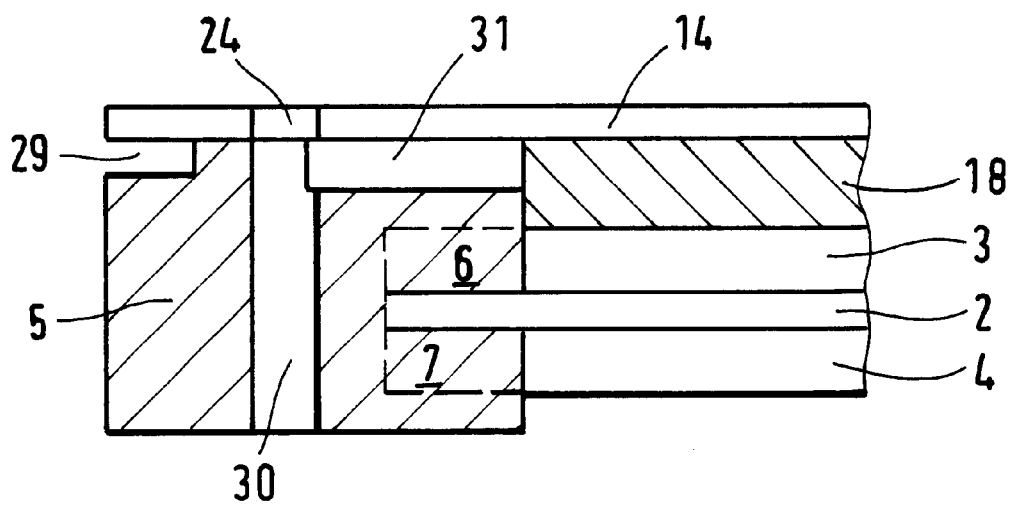
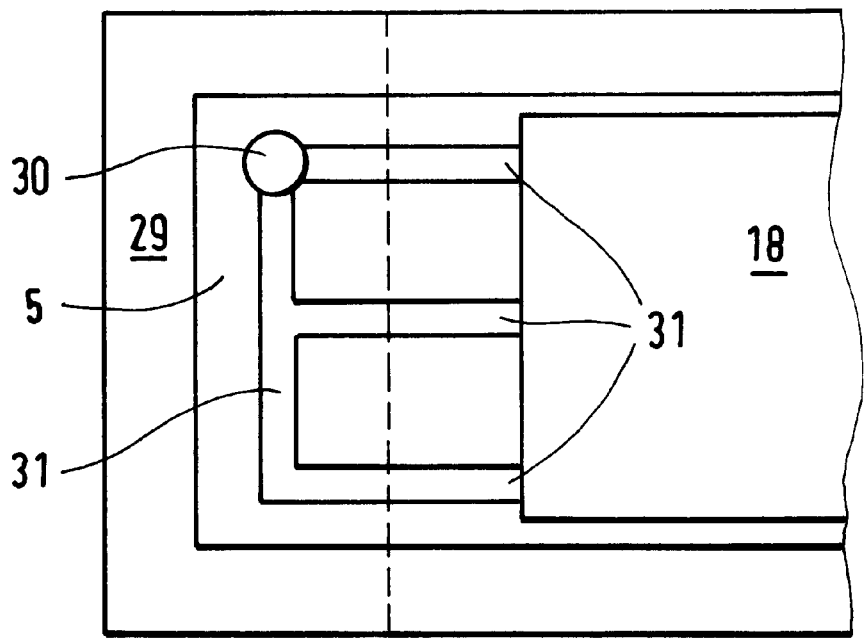
FIG.11

US 6,475,656 B1

MEMBRANE-ELECTRODE UNIT WITH AN INTEGRATED WEAR RING, AND METHOD OF MAKING THE SAME

This application is 371 of PCT/EP98/00479, filed Jan. 29, 1998.

BACKGROUND OF THE INVENTION

The present invention relates to a membrane-electrode unit for a polymer electrolyte membrane fuel cell having a polymer electrolyte membrane, an anode arranged on one surface of the membrane and a cathode arranged on the other surface of the membrane, as well as to a method of making the membrane-electrode unit.

Polymer electrolyte membrane fuel cells, as they are commonly employed for producing electric current, contain an anode, a cathode and an ion exchange membrane disposed therebetween. A plurality of fuel cells constitutes a fuel cell stack, with the individual fuel cells being separated from each other by bipolar plates acting as current collectors. The bipolar plate on the anode side of a cell constitutes at the same time the cathode side bipolar plate of the neighboring cell. For generating electricity, a burnable gas, e.g. hydrogen, is introduced into the anode region, and an oxidizing agent, e.g. air or oxygen, is introduced into the cathode region. Both the anode and cathode in the regions in contact with the polymer electrolyte membrane contain a catalyst layer. In the anode catalyst layer, the fuel is oxidized thereby forming cations and free electrons, and in the cathode catalyst layer, the oxidizing agent is reduced by taking up electrons. As an alternative, the two catalyst layers may also be applied on opposite sides of the membrane. The structure of an anode, a membrane, a cathode and the corresponding catalyst layers is referred to as membrane-electrode unit. The cations formed on the anode side migrate through the ion exchange membrane to the cathode and react with the reduced oxidizing agent, thereby forming water when hydrogen is used as burnable gas and oxygen is used as oxidizing agent. The heat created in the reaction of burnable gas and oxidizing agent is dissipated by exactly fitting manner for each individual membrane-electrode unit. Inexpensive manufacture of membrane-electrode units in the form of square-meter material is not possible. Moverover, the seals must be cut separately and then attached in an exactly fitting manner. cooling. For better distribution of the reaction gases and, possibly, for supporting the membrane-electrode unit, gas-conducting structures, e.g. grid-like nets, may be provided between electrodes and bipolar plates.

Upon installation in a fuel cell, the membrane-electrode unit is in contact on the anode side with the burnable gas and on the cathode side with the oxidizing agent. The polymer electrolyte membrane separates the regions containing the burnable gas and the oxidizing agent, respectively, from each other. For preventing contact of the burnable gas and oxidizing agent, which could cause explosion-like reactions, reliable sealing of the gas spaces from each other must be ensured. In this respect, a problem is present in particular for providing a sealing against burnable gas hydrogen that has excellent diffusion properties.

In order to prevent that a gas exchange can take place in the fuel cell along the edges of the membrane, the following measures are taken conventionally: in producing conventional membrane-electrode units, the dimensions for the membrane and electrodes are selected such that, with a sandwich-like arrangement of the membrane between the electrodes, the membrane projects on each side a good distance beyond the area of the electrodes. The conventional membrane-electrode unit thus comprises a membrane with the edge portions that are not covered by electrode material. Flat seals, e.g. of stretched PTFE, are attached around the periphery of the membrane-electrode unit on both sides of the membrane so as to cover the projecting portions of the membrane. In case of a square membrane-electrode unit, for example, square frames are pressed on and/or attached adhesively on both sides of the membrane, such that they at least partly cover the projecting portions of the membrane. These conventional membrane-electrode units on the one hand involve the disadvantage that they are quite complex in manufacture since the anode, cathode and membrane must each be cut separately and then must be assembled in an exactly fitting manner for each individual membrane-electrode unit. Inexpensive manufacture of membrane-electrode units in the form of square-meter material is not possible. Moreover, the seals must be cut separately and then attached in an exactly fitting manner.

A further disadvantage of the conventional membrane-electrode units becomes evident in mounting the same in a fuel cell. In the fuel cell, a gastight space must be provided at least on the anode side between membrane-electrode unit and the bipolar plate confining the cell. Conventionally, sealing rings or strips are employed here between membrane-electrode unit and bipolar plate, with several cells each being clamped together in series and being provided with a joint supply of burnable gas. The gastight spaces are formed upon such clamping together only. In case of a leak, it is difficult to locate the same, and it is not possible either to remove just one cell, but only the clamped together unit containing the leak. This involves considerable expenditure in work and loss of useful time of the fuel cell.

Occasionally, it is dispensed with providing the membrane-electrode unit with a pressed-on sealing frame. Sealing then is effected upon installation in a fuel cell by clamping a sealing ring between the membrane part not covered by electrode material and the adjacent bipolar plate. In both cases, a gap results between the electrode material and the seal, making the arrangement sensitive to mechanical damage, in particular in case of thin or brittle membranes. Furthermore, there is the risk that the membrane-electrode unit is not clamped in a completely planar manner so that the membrane contacts the metallic current lead-out conductor. The metal then may be partly removed by an acid membrane. The metal ions enter the membrane, thereby impairing the conductivity thereof.

The present invention allows to overcome the above-indicated disadvantages.

SUMMARY OF THE INVENTION

It is the object of the invention to make available a membrane-electrode unit for a polymer electrolyte membrane fuel cell, which on at least one side can be connected to a bipolar plate in such a manner that a gastight space is formed between membrane and bipolar plate.

Another object of the invention is to make available a membrane-electrode unit in which the assembly membrane-electrode unit/bipolar plate can be tested for gas tightness separately.

A further object of the invention consists in making available a simple, inexpensive method of making such membrane-electrode units.

In making the membrane-electrode unit, according to the invention, the anode, cathode and membrane are not cut separately and the individual parts then connected to each other, but rather a layer material is produced consisting of an anode material, a cathode material and a membrane material disposed therebetween, for example by means of a rolling method as employed in paper production. This provides square-meter material from which the individual membrane-electrode units can be cut, punched or severed in another manner in one operation in the desired size. A membrane-electrode unit obtained in this manner contains, apart from the end face, no free membrane area, but rather the membrane on both surfaces thereof is fully covered by the anode material and the cathode material, respectively. If desired, passages can be formed in the membrane-electrode unit, which is possible in one operation as well.

The membranes, electrodes and catalysts used for manufacturing the membrane-electrode unit according to the invention as such may be conventional materials, as they are commonly used for corresponding purposes. As electrodes, i.e. anodes and cathodes, there may be used, for example, diffusion electrodes of carbon paper or graphitized fabrics, containing a catalyst having an arbitrary distribution parallel and also vertical to the electrode area. Instead of carbon paper or graphitized fabrics, however, nonwoven fabrics of carbon fiber material may be used as well. As catalyst, it is possible to use e.g. platinum on carbon. The electrodes may contain only the catalyst layer, part of the diffusion layer or the entire diffusion layer. As an alternative thereto, the catalyst may also be applied to the surfaces of the membrane. As membranes, the usual ion-conducting polymers, for example nafion or a sulfonized polyether ether ketone ketone (PEEKK, available from Hoechst), are employed in advantageous manner.

The membrane-electrode units in the form of square-meter material can be manufactured under procedural conditions as in case of the conventional, individual membrane-electrode units. In case of the invention, one web of electrode material each is disposed on each surface of a web of a polymer electrolyte membrane present in its $H^{3O}$ form, and thereafter is rolled on preferably at pressures of about 30 bar to 500 bar and temperatures of up to 250° C. Typical pressures are between about 80 and 250 bar and temperatures between about 80 and 120° C. When the electrode material contains the catalytically active layer, it must be rolled onto the membrane such that the catalytically active layer is in contact with the membrane.

As an alternative, it is also possible to apply one electrode first and to apply the second electrode in a second operation.

From this membrane-electrode layer material, membrane-electrode units are cut in the desired size in one operation, and at least around the periphery of each membrane-electrode unit there is formed a sealing edge that connects the membrane and the electrode or electrodes to each other in a gastight manner and, furthermore, may be connected in a gastight manner to a bipolar plate. The term "membrane-electrode unit" as used herein thus, in the sense of the invention, refers to layer material pieces of anode, cathode and membrane material without or with sealing edge, in which, apart from the end face, there is in essence no membrane area present that is not covered by electrode material. The sealing edge or wear ring is provided by having a sealing agent, for example a plastic material or a mixture of plastic materials, penetrate into edge portions of the electrodes at the periphery of the membrane-electrode unit, such that the pores of the electrodes are substantially filled and no longer allow gas to pass. The plastic material, preferably a thermoplastic material or a curable liquid plastics material of low viscosity, can penetrate into the electrodes by capillary action an can then be cured, or a plastic material in liquid form, i.e. molten, uncured or dissolved in a solvent, can be pressed onto the electrode, possibly using the required pressure (preferably up to 200 bar) and/or elevated temperature in a suitable device, so as to fill the pores of the electrode in this manner. If necessary, an evacuation can be carried out before in order to remove air from the pores and thus facilitate penetration of the sealing agent. Preferred plastic materials are polyethylenes, polypropylenes and polyamides as well as epoxy resins, silicones and polyester resins. To provide enhanced wetting of the edge portions of the electrodes through which the plastic material should penetrate, it is possible, prior to the treatment thereof with plastic material, to wet the same with a solvent for the plastic material or to slightly mill the same at the surface. Partial oxidizing of the respective regions of the carbon materials of the electrodes may be advantageous as well.

The sealing edge thus formed around the periphery of the membrane-electrode unit prevents the discharge of reaction gases from the electrodes "radially" outwardly by "clogging" the gas paths in the edge portion of the electrodes and, furthermore, provides for gastight glueing together and adhesion of the edge portion of the electrodes to the adjoining membrane portion.

Such seals may be provided in all regions of the membrane-electrode unit in which edges are present, e.g. also at passages through the active areas of the membrane-electrode unit, as they are often required for the supply of gases, water or for clamping screws.

As an alternative, a sealing edge can be provided by attaching a sealing frame around the periphery of the membrane-electrode units, at the substantially flush end faces thereof, or by lining passages completely or in part with a sealing frame, respectively. Possible materials for the sealing frame are preferably plastic materials or plastic material mictures, in particular thermoplastic materials such as polyethylenes, polypropylenes and polyamides or curable plastic materials such as epoxy resins, silicones or polyester resins. The sealing frame is attached in such a manner that it firmly connects to and adheres to the end faces of the membrane or the end faces of at least one electrode and the membrane, respectively, in a gastight manner.

The required passages may also be provided directly in the sealing edge itself.

Mixed forms of the two sealing edge alternatives, i.e. sealing edges formed partly within the electrode material and partly at the end faces, are possible as well.

The membrane-electrode units sealed at the periphery and possibly at passages can then be connected to bipolar plates. As a rule, bipolar plates must not rest on the electrodes directly, but there must be a free space left between electrode and bipolar plate, in which a gas-conduting structure, e.g. a net, can be provided for enhanced distribution of reaction gases across the surface of the electrode. This free space can be provided by having the sealing edge not terminate flush with the electrode surface, but designing it so as to project beyond the electrode surface, In case of electrodes with projecting sealing edge, a planar bipolar plate can be connected to the sealing edge, e.g. by gastight adhesion, or may be pressed on in the fuel cell stack under permanent pressure and thus be rendered gastight. When the sealing edge ends flush with the electrode surface, a bipolar plate may be used which is formed thinner in the portion in which the gas-conducting structure is to be applied than in the portion connected in gastight manner to the sealing edge of the membrane-electrode unit. Bipolar plates containing an integrated gas-conducting structure, such as e.g. graphite plates with milled grooves, do not require projecting sealing edges, either.

The sealing structure of the membrane-electrode unit according to the invention can be applied in general for all reaction gases. However, in particularly advantageous manner it can be employed on the hydrogen side of a fuel cell since hydrogen on the one hand has very good diffusion properties and thus presents the greatest problems in sealing, and since hydrogen on the other hand is very reactive, thereby presenting considerable difficulties in case of a leak.

The formation of a sealing edge by introduction of a sealing agent into the electrode edge portions as well as sealing of passages by introduction of a sealing agent into the electrode portions surrounding the passages is possible on principle with any membrane-electrode electrode unit with porous electrodes, irrespective of whether a flush end face termination is present. In particular, sealing according to the invention is also possible with passages, irrespective of the type of seal chosen for the outer periphery of the membrane-electrode unit.

BRIEF DESCRIPTION OF THE DRAWINGS

Particularly preferred embodiments of the invention will be elucidated by way of the following drawings, in which FIG. 7 shows a cross-section of a membrane-electrode unit according to a further embodiment of the invention, in combination with a bipolar plate applied on one side, FIG. 8 shows a cross-section of a membrane-electrode unit according to the invention, having projecting sealing edges connected to bipolar plates, FIG. 9 shows a cross-section of a membrane-electrode unit according to the invention, having flush sealing edges connected to bipolar plates, FIG. 10 shows a cross-section of a membrane-electrode unit according to the invention, having passages in the sealing edge, FIG. 11 shows a plan view of a membrane-electrode unit according to the invention, having passages in the sealing edge, FIG. 12 shows a cross-section of a fuel cell mounted in a fuel cell stack and having a membrane-electrode unit according to the invention.

DETAILED DESCRIPTION OF THE INVENTION

Figure 3:
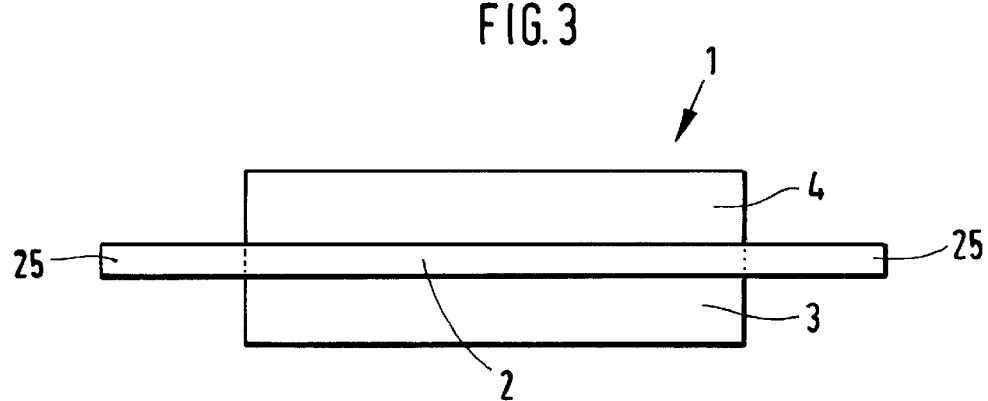
FIG. 3 shows a cross-section of a membrane-electrode unit according to the prior art.

Membrane-electrode units 1 consist of a membrane 2, an anode 3 attached to one surface of the membrane and a cathode 4 attached to the other surface of the membrane. Each side of the electrodes facing the membrane contains catalyst. With conventional membrane-electrode units, as shown in FIG. 3, anode 3 and cathode 4 have identical dimensions, while membrane 2 is considerably larger, so that membrane edge portions 25 are formed during lamination that are not covered by porous electrode material and to which seals can be applied. However, such a construction does not render possible simple and rapid manufacturing methods.

Figure 1:
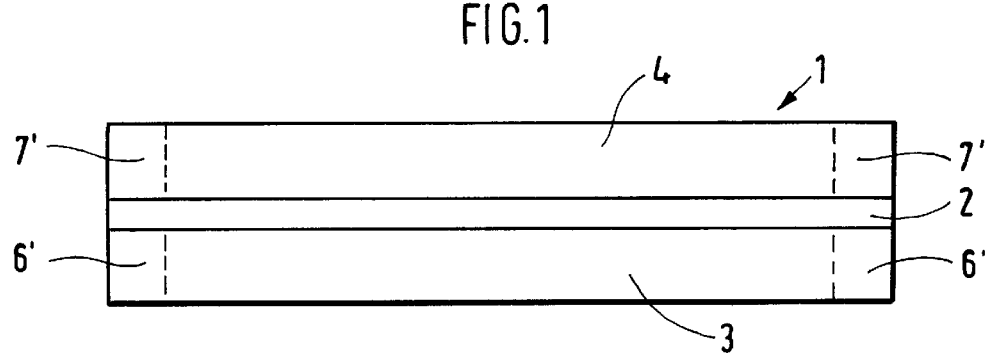
FIG. 1 shows a cross-section of a membrane-electrode unit according to the invention, without the sealing edge or wear ring.

According to the invention, membrane-electrode units can be manufactured simply and rapidly by producing large area pieces or webs of membrane-electrode unit material and then dividing the same into separate membrane-electrode units of the desired size. The thus obtained separate membrane-electrode unit, however, as can be seen in FIG. 1, has no membrane area, except the end face, that is not covered by electrode material. Conventional seals thus cannot be applied due to the porosity of the electrodes.

According to the invention, the membrane-electrode unit 1 in which membrane 2, anode 3 and cathode 4 terminate in flush manner at the end faces, is sealed by having a sealing agent, for example a plastic material, penetrate an edge portion 6' of anode 3 and an edge portion 7' of cathode 4. The edge portions 6' and 7' merely define the regions into which the sealing agent is supposed to penetrate. The sealing agent fills the pores of the porous electrodes and provides gastight adhesion to the membrane. As a result, discharge of reaction gases in molecular form from the electrodes in "radial" direction or discharge along the interfaces between electrodes and membrane is prevented.

Figure 4:
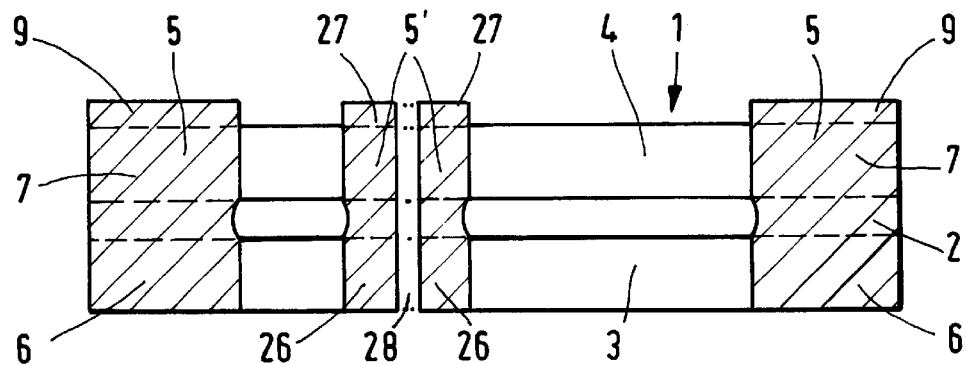
FIG. 4 shows a cross-section of a membrane-electrode unit with sealing edge and passage, according to an embodiment of the invention.

The sealing edge or wear ring 5 of the membrane-electrode unit according to the invention may have different designs as regards shape and dimensions thereof. FIG. 4 depicts a membrane-electrode unit in which the anode-side part 6 of the sealing edge 5, i.e. the portion of sealing edge 5 penetrating the edge portion 6' of the anode, terminates flush with the surface of the anode 3 facing away from the membrane, whereas the cathode-side part 7 of the sealing edge 5, i.e. the portion of sealing edge 5 penetrating the edge portion 7' of the cathode, contains a portion 9 projecting beyond the surface of the cathode 4 facing away from the membrane. Furthermore, the membrane-electrode unit contains a passage 28 having a sealing edge 5', i.e. an anode-side sealing edge 26 and a cathode-side sealing edge 27. The cathode-side part 27 of sealing edge 5' projects beyond the surface of the cathode facing away from the membrane. In the embodiment shown in FIG. 4, both the passage 28 and the sealing edge 5' extend through the entire membrane-electrode unit 1. A sealing agent is also diffused into the membrane 2. However, a passage and/or sealing edge may also terminate in an electrode. For example, hydrogen can be supplied to the anode through a passage that is partly sealing-edge-free in the anode, and may diffuse into the same. As an alternative, the passage may also be integrated in the sealing edge, as will be elucidated in more detail hereinafter.

Figure 2:
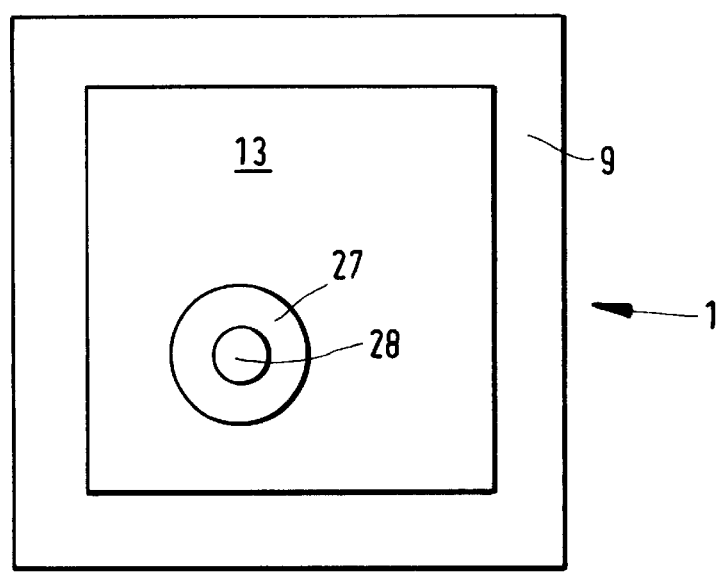
FIG. 2 shows a plan view of an electrode-membrane unit according to the invention.

FIG. 2 shows a plan view of the embodiment according to FIG. 4 from the cathode side. The membrane-electrode unit shown there is of square configuration. However, it may also have any other configuration. As can be seen from FIG. 2, the cathode is sealed at the entire periphery thereof and at the passage 28 and contains a free cathode portion 13 within the projecting portion 9 of the sealing edge. Such a free portion permits the application of gas-conducting structures at the respective electrode, as they are necessary as a rule when using reaction gases with moderate diffusion properties or in case of strong dilution by inert gases. When hydrogen is used, which has excellent diffusion properties, a gas-conduting structure often can be dispensed with. Thus, when using $H_2$ as burnable gas, it is possible on the anode side to attach the bipolar plate concluding the fuel cell directly onto the anode 3, without interposition of a gas-conducting structure, so that the anode side part 6 of sealing edge 5 can terminate here flush with the anode surface, as shown in FIG. 4.

Figure 5:
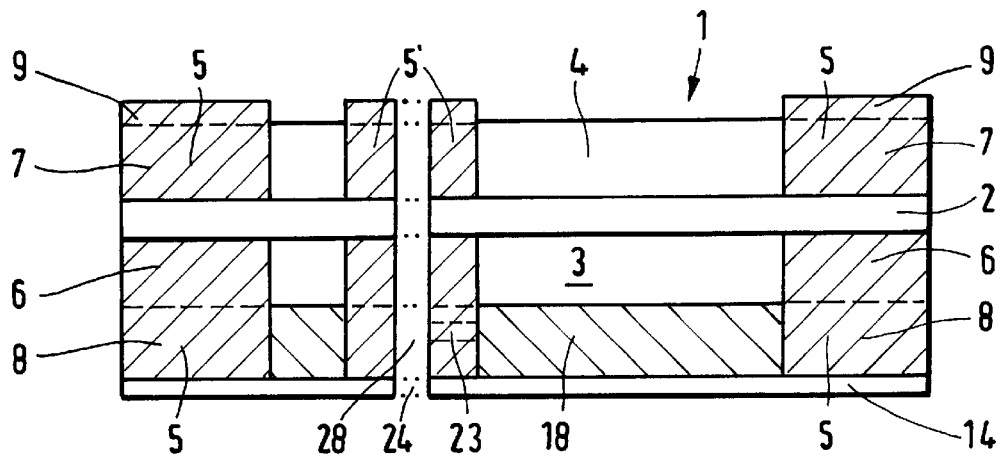
FIG. 5 shows a cross-section of a membrane-electrode unit with sealing edge, passage and bipolar plate, according to an embodiment of the invention.

FIG. 5 shows a membrane-electrode unit 1 according to the invention, having a bipolar plate 14 on the anode side. Bipolar plate 14 is connected in a gastight manner, e.g. by adhesion, to the projecting portions 8 of the sealing edge, so that a gastight space is formed between membrane 2, anode-side sealing edge 6 and bipolar plate 14. Adhesion takes place preferably by the sealing agent itself. The membrane-electrode unit and the bipolar plate 14 contain a passage 28 and 24, respectively, for burnable gas for supplying and discharging the same, respectively. Between bipolar plate 14, anode 3 and projecting portions 8 of the sealing edge, there is room for providing a gas-conducting structure 18, for example a grid-like net. In the embodiment shown in FIG. 5, a sealing edge 5' is formed around passage 28, which projects beyond the anode surface facing away from the membrane, to the same extent as sealing edge 5 formed on the periphery of the membrane-electrode unit. Bipolar plate 14 thus is additionally supported by sealing edge 5'. The hydrogen flowing through passage 28 partly enters the gas-conducting structure 18 of the fuel cell through an opening 23 in sealing edge 5' and partly is passed on to the neighboring cell through passage 24 in bipolar plate 14. Such introduction of hydrogen (or other gases) is also possible when the passage is integrated in the sealing edge at the periphery of the membrane-electrode unit.

The same is possible for the supply of oxidizing agent at the cathode.

For forming the sealing edge 5, an arbitrary sealing agent can be employed that is capable to penetrate into the pores of the electrode edge portions, to remain there in substantially unchanged manner under the operating conditions of a fuel cell and to form a barrier against the discharge of reaction gases. Suitable are in particular curable plastics materials as well as plastics materials capable of penetrating the pores of the electrodes in defined portions thereof by utilization of increased temperature and/or pressure, possibly after a preceding evacuation.

To form the sealing edge, or example a piece of a membrane-electrode material cut or stamped to the proper size is placed in a casting mold, with the portions of the electrodes that are not supposed to be formed with a sealing edge and, possibly, the portions with passages therein being delimited from the casting mold. The plastic material then may be filled in liquid form, e.g. a thermoplastic material liquefied by heat, and may be pressed into the pores of the electrodes in the non-confined electrode portions by application of pressure, preferably up to 200 bar. Depending on whether it is desired to obtain sealing edges terminating flush with the electrode surfaces, or sealing edges projecting beyond the electrode surfaces, the design of the molding tool must be chosen in corresponding manner.

In case of membrane-electrode units of common dimensions (approx. 3 cm$^2$ to 1,600 cm$^2$), it is favorable to provide sealing edges having a width of approx. 0.3 cm to 1 cm, typically 0.5 cm. The height of the possibly projecting portions of the sealing edge is dependent on the thickness of the gas-conducting structure to be attached to the electrode.

As an alternative to the introduction or pressing-in of a plastic material liquefied by increased temperature into the pores of the electrodes by application of pressure, it is also possible to use a curable liquid plastic material of low viscosity which penetrates the pores in the edge portions of the electrodes by capillary action and is cured thereafter.

Suitable curable plastic materials are, in particular, epoxy resins, silicones and polyester resins. Suitable thermoplastics materials are, in particular, polyethylenes, polypropylenes and polyamides.

In the following, an example of manufacturing a membrane-electrode unit 1 according to the invention will be described.

A membrane-electrode material, consisting of a membrane Gore Select of the company Gore & Associates, Inc., a cathode according to patent application P 19 544 323.3 of the company Magnet Motor GmbH, and a conventional anode, is cut to a size of about 90×50 mm. A cathode according to the afore-mentioned patent application is a gas diffusion electrode consisting of a carbon fiber nonwoven fabric impregnated in substantially homogeneous manner with soot and polytetrafluoroethylene (mass ratio in the instant case 5:1). The catalyst used here is platinum on carbon. The membrane is completely covered by the electrodes. The cut membrane-electrode unit is placed into a casting mold the bottom surface of which is lowered by approx. 0.3 mm at the periphery thereof, across a width of about 5 mm. The membrane-electrode unit, in the edge portion thereof, does not rest directly on the bottom surface of the casting mold. Placed onto the membrane-electrode unit is a plate of special steel having a configuration corresponding to the baseplate, but being a mirror image with respect to the arrangement in relation to the membrane-electrode unit. The membrane-electrode unit, thus, also on its other surface is not in direct contact with the casting mold in an edge portion having a width of approx. 5 mm. Instead of the base and cover plates, bipolar plates may be used as well, so that the membrane-electrode unit is adhered to the bipolar plates at the same time with the formation of the sealing edge. The mold is provided with bores for introducing plastic material through which the free volumes of the casting mold are filled with the epoxy resin Körapox 439 of the company Kömmerling (Germany) or the DD-based two-component varnish CFM of the company Dr. Wiedeking. The epoxy resin casting compound 5100/5620 GA of the company Rhenatech GmbH also is a very suitable material. These plastic materials, due to capillary action, creep or wick into the pores of the electrodes, predominantly in the not covered portions of the electrodes. Thus, several refilling steps are necessary during the potlife. Thereafter, the plastic materials are cured at a temperature of approx. 60° C., and the finished membrane-electrode unit is removed from the mold. In this manner, a membrane-electrode unit having sealing edges 6 in the anode region and sealing edges 7 in the cathode region is formed, which have a width of approx. 5 mm and project approx. 0.3 mm beyond the surfaces of the electrodes.

Figure 6:
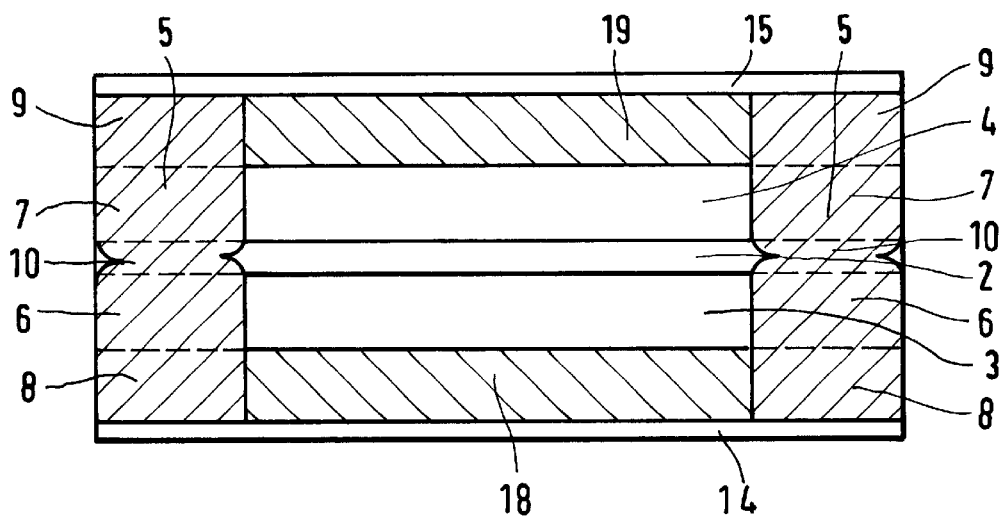
FIG. 6 shows a cross-section of a membrane-electrode unit with sealing edge, according to another embodiment of the invention, in combination with bipolar plates applied on both sides.

Depending on the material of the membrane 2, the sealing agent used and the conditions under which the sealing edge is produced. (pressure, temperature), the sealing agent possibly can also penetrate into the membrane, thereby forming sealing-agent-filled portions 10 of the membrane, as shown in FIG. 6. Depending on the sealing edge modification desired, the reaction conditions required in each particular case can easily be determined by the expert by orienting pre-tests in accordance with the materials selected. Membrane-electrode units 1 with a sealing edge 5 partly penetrating the membrane 2 are of extremely high tightness against the discharge or transgression of reaction gases The embodiment of the membrane-electrode unit 1 according to the invention, as shown in FIG. 6, has a bipolar plate 14 mounted on the anode side and a bipolar plate 15 mounted on the cathode side, so as to form a fuel cell, with gastight spaces being formed each between membrane 2, anode-side sealing edge 6 and bipolar plate 14 and between membrane 2, cathode-side sealing edge 7 and bipolar plate 15, respectively. Between the projecting portions 8 and 9, respectively, of the sealing edges there are provided cavities for accommodating gas-conducting structures 18 and 19, respectively.

An alternative embodiment of the sealing edge 5 of a membrane-electrode unit 1 according to the invention is shown in FIG. 7. The sealing edge 5 thereof does not, or only partly, penetrate pores of the electrode material, but adheres to the end face of the membrane, the membrane and an electrode or part of an electrode or, as shown in FIG. 7, to the periphery of the entire membrane-electrode unit. It must be ensured in such an embodiment that the adhesion between sealing material and membrane and the materials of the electrodes, respectively, is sufficiently firm and tight to prevent discharge of reaction gases. Possible materials for forming the sealing edge 5 are plastic materials, primarily such plastic materials as they are also suitable for the first embodiment of the sealing edge. To definitely ensure adhesion on the end face of the very thin membrane 2, a bonding agent, e.g. a bonding agent precipitating $SiO_2$, 11 can be applied before forming of the sealing edge 5, or the end face of the membrane can be slightly etched. This embodiment is particularly suitable for somewhat thicker membranes (starting from approx. 100 $\mu$m), whereas the sealing edges formed by penetration of sealing agent into the pores of the electrode edge portions cab be applied in preferred manner with arbitrarily thin membranes (e.g. 5 $\mu$m).

The application of the sealing edge on the end face takes place in similar manner to the formation of the sealing edge in edge portions of the electrodes, namely by placing a piece of membrane-electrode material of suitable size into a casting mold leaving room for the introduction of sealing agent in those portions in which the sealing edge is to be formed, introducing and then solidifying or curing the sealing agent. In case the sealing edge is to have passages therein, the casting mold must be designed such that no or only little sealing agent can penetrate into the passage portions. This can be attained, for example, by using pins providing poor adhesion for the sealing agent and being thus easily removable subsequently. The width of sealing edges applied on the end face in case of membrane-electrode units of usual size is about 0.2 cm to 1 cm, preferably about 0.5 cm or less.

When forming the sealing edge at the end faces of membrane 2 and electrodes 3, 4, sealing agent may also penetrate the edge portions of the electrodes in case of suitable reaction conditions, so that a combination of end-face sealing edge and sealing edge in the electrode edge portions 6', 7' is obtained, as outlined in FIG. 7 in broken lines.

FIGS. 8 and 9 show alternative possibilities of forming a cavity for accommodating a gas-conducting structure, with FIG. 6 showing the afore-described possibility of the design with projecting edges. In the embodiment shown in FIG. 9, the sealing edges 6 and 7 on anode and cathode, respectively, terminate flush with the surfaces of anode and cathode, respectively. Rather, the bipolar plate 14 has a thin central portion and a thick edge portion 16 and 17, respectively, with the difference between the thickness of the edge portion and the thickness of the central portion defining the height of the space available for accommodating a gas-conducting structure. The width of the edge portions 16 and 17 is selected preferably in accordance with the width of sealing edge 5.

For achieving particularly firm adhesion between sealing edge 5 and bipolar plate 14, 15, the projecting portions 8, 9 of the sealing edge may be provided with recesses 29 for receiving additional adhesive, e.g. silicone.

For supplying reaction gases, cooling agent or for attaching mounting devices, it is often necessary to provide one or more openings or passages in the membrane-electrode units that must be sealed against discharge or transgression of gases. These passages may each be sealed separately for itself, as shown in FIGS. 4 and 5, in which only one passage each is provided that is sealed by portions 5' filled with sealing agent. If several passages are required, these may also be combined to form one or several groups of closely adjacent passages that are sealed jointly, i.e. the passages of a group are separated from each other and from the active region of the membrane-electrode unit by portions 5' filled with sealing agent.

With this embodiments, however, a partial region of the membrane-electrode unit must be utilized for the passages and the sealing thereof, which otherwise would be available as active region. This loss in active region can be avoided when the passages are integrated in the sealing edge at the periphery of the membrane-electrode unit, as shown in exemplary manner in FIGS. 10 and 11.

FIG. 10 shows a membrane-electrode unit with membrane 2, anode 3, cathode 4 and sealing edge 5 at the outer periphery of the membrane-electrode unit, with sealing agent having also penetrated the edge portions of anode 3 and cathode 4, thereby forming sealing portions 6 and 7, respectively. Sealing edge 5 projects beyond the anode surface and beyond the cathode surface. In the sealing edge portion consisting only of sealing agent, there is provided a passage 30 extending substantially perpendicularly to the plane of the membrane-electrode unit. At the level of the portion of the sealing edge 5 projecting beyond the anode surface, horizontal manifold passages, i.e. manifold passages extending parallel to the membrane-electrode unit, are branched off as can be seen from FIG. 11. FIG. 11 shows a plan view of the membrane-electrode unit according to FIG. 10 as seen from the anode side (without bipolar plate 14). These manifold passages, mainly for reasons of simple manufacture thereof, have the shape of grooves 31 in the anode-side surface of the sealing edge 5 and open into the space between anode surface and bipolar plate 14, which contains a gas-conducting structure. Grooves or corrugations 31 can be formed into the surface of the sealing edge 5 during formation of the latter by making use of an appropriately designed casting mold, or they may be formed in the sealing edge subsequently, e.g. by milling. Bipolar plate 14, at the location above passage 30, has a passage 24 and, as for the rest, terminates the grooves 31 and the space for the gas-conducting structure 18 above the anode in gastight manner. Hydrogen flowing through passage 30 can thus be supplied on the one hand through grooves 31 of anode 3 and can be passed on through passage 24 in bipolar plate 14 into the neighboring cell on the other hand. For providing particularly firm adhesion between sealing edge and bipolar plate, the sealing edge is provided with a recess 29 into which additional adhesive is introduced.

The membrane-electrode unit with passages in the sealing edge, according to the invention, can be produced as elucidated hereinbefore for sealing edges without passage; the portions of the subsequent passages and grooves must be delimited from the mold so that no sealing agent can enter. As an alternative, it is also possible to provide first a sealing edge without passage and/or grooves and to apply the same to the finished sealing edge, for example by drilling, punching or milling.

FIG. 12 shows a cutout of a fuel cell stack comprising fuel having membrane-electrode units 1 according to the invention. In the fuel cell stack shown, oxygen is not introduced into closed and sealed oxidizing agent spaces, but is blown by a fan between the bipolar plate constituting the boundary of a cell and the cathode surface of the neighboring cell, with a grid-like net between bipolar plate and cathode ensuring that the required distance is kept. The unit shown in FIG. 12, consisting of membrane 2, anode 3, cathode 4 and bipolar plate 14 (with gas passages 20 for hydrogen), in case a hydrogen leak arises at an arbitrary location in the course of the operating life of the fuel cell stack. With this structure, the hydrogen or other gas can be removed individually from the stack without a problem, so that the anode space of each individual cell can be checked separately for tightness. Input 21 supplies hydrogen to passage 2, while discharge 22 releases hydrogen from passage 20.

The present invention thus renders possible to manufacture membrane-electrode units in simple and inexpensive. manner, which in combination with a bipolar plate render possible the formation of gastight electrode spaces. In each fuel cell, the gastight electrode spaces can be checked separately for gas tightness thereof.

What is claimed is:

1. A membrane-electrode unit with an integrated sealing edge for a polymer electrolyte membrane fuel cell having a polymer electrolyte membrane, an anode electrode arranged on one surface of the membrane and a cathode electrode arranged on the other surface of the membrane, wherein both surfaces of the membrane are covered substantially completely by the electrodes and a sealing edge is provided around the periphery of the membrane-electrode unit, said sealing edge penetrating an edge portion of at least one of the electrodes such that the pores of the at least one electrode are substantially filled in at the edge portion, and said sealing edge adhering to the portion of the membrane in contact with said edge portion, and to the end faces of said membrane and siad at least one electrode.

2. The membrane-electrode unit of claim 3, further comprising at least one passage located outside of the sealing edge provided around the periphery of the membrane-electrode unit and on which, at least in a partial region, a second sealing edge is provided selected from at least one of 1) a sealing edge which penetrates a passage-surrounding edge portion of at least one of the electrodes and adheres to the portion of the membrane in contact with the edge portion and 2) a sealing edge adhering to at least the end faces of said membrane.

3. The membrane-electrode unit of claim 1, further comprising at least one passage in the sealing edge around the periphery of the membrane-electrode unit.

4. The membrane-electrode unit of claim 3, wherein the sealing edge has formed therein at least one means communicating with said passage for supplying a reaction gas to at least one electrode or an electrode space.

5. The membrane-electrode unit of claim 1, wherein the sealing edge penetrates an edge portion of the anode and adheres to the portion of the membrane in contact with said edge portion.

6. The membrane-electrode unit of claim 1, wherein the sealing edge adheres to the end faces at least of the anode and to the end faces of the membrane.

7. The membrane-electrode unit of claim 1, wherein the sealing edge terminates flush with the surface of the at least one electrode facing away from said membrane.

8. The membrane-electrode unit of claim 1, wherein the sealing edge is projecting beyond the surface of the at least one electrode facing away from said membrane.

9. The membrane-electrode unit of claim 8, further comprising a recess for receiving adhesive located in the projecting portion of the sealing edge.

10. The membrane-electrode unit of claim 1, wherein the sealing edge comprises plastic material.

11. The membrane-electrode unit of claim 10, wherein the plastic material is a thermoplastic material or a curable plastic material which, in the molten state or prior to curing, respectively, is sufficiently liquid and of sufficiently low viscosity for being able to penetrate into the pores of at least one of the electrodes by capillary action.

12. The membrane-electrode unit of claim 10, wherein the plastic material, at ambient temperature or elevated temperature, is sufficiently liquid and of sufficiently low viscosity to be able to penetrate into the pores of at least one of the electrodes under pressure.

13. The membrane-electrode unit of claim 10, wherein the plastic material is a polyethylene, a polypropylene or a polyamide.

14. The membrane-electrode unit of claim 10, wherein the plastic material is an epoxy resin, a silicone or a polyester resin.

15. The membrane-electrode unit of claim 1, wherein the sealing edge at least of the anode is adhered to a bipolar plate in a hydrogen-tight manner.

16. A method of making a membrane-electrode unit with an integrated sealing edge for a polymer electrolyte membrane fuel cell, comprising the following steps:

forming a membrane-electrode layer material made of an anode electrode and a cathode electrode with a polymer electrolyte membrane disposed therebetween;

severing a piece of the layer material in a size suitable for making a desired membrane-electrode unit, the membrane of said severed piece, on both surfaces thereof, being covered substantially completely by the electrodes;

forming a sealing edge around the periphery of said severed piece by one of having a sealing agent penetrate into an edge portion of at least one of the electrodes, the pores of the at least one electrode being filled substantially completely in said edge portion such that the sealing edge penetrates an edge portion of at least one of the electrodes and adheres to the portion of the membrane in contact with the edge portion, and by applying a sealing agent to the end face of at least one of the electrodes and to the end faces of the membrane such the sealing edge adheres to the end faces of said membrane and said at least one electrode.

17. The method of claim 16, further comprising the following steps:

forming a passage outside of the sealing edge around the periphery of said severed piece; and forming a second sealing edge at least on a partial region of a passage-surrounding edge portion of at least one of the electrodes by at least one of having a sealing agent penetrate into a passage-surrounding edge portion of the at least one electrode, the pores of the at least one electrode being filled substantially completely in said passage-surrounding edge portion such that the sealing edge penetrates the passage-surrounding edge portion and adheres to a portion of the membrane in contact with the passage-surrounding edge portion, and applying a sealing agent to end faces of at least the membrane such that the second sealing edge adheres to the end faces at least of said membrane.

18. The method of claim 16, wherein in the sealing edge, there is formed at least one means communicating with the passage for supplying a reaction gas to at least one electrode or an electrode space.

19. The method of claim 18, wherein the at least one communicating means is provided in the form of grooves in a surface of the sealing edge.

20. The method of claim 16, wherein the sealing agent forming the sealing edge is a thermoplastic or curable plastic material.

21. The method of claim 20, wherein the plastic material is polyethylene, polypropylene or a polyamide.

22. The method of claim 20, wherein the plastic material is an epoxy resin, a silicone or a polyester resin.

23. The method of claim 20, wherein the step of forming the sealing edge further includes bringing plastic material in liquid form in contact with an edge portion of at least one of the electrodes, and solidifying or curing.

24. The method of claim 16, further comprising the step of forming at least onr passage in said edge portion of the at least one of said electrodes either before forming the sealing edge or after having formed the sealing edge.

25. The method of claim 16, wherein the sealing edge is formed using pressure and/or elevated temperature.

26. The method of claims 25, wherein evacuation is carried our prior to the application of pressure.

27. The method of claim 16, wherein the sealing edge is formed by having the sealing agent penetrate by capillary action into the edge portion of at least one of the electrodes.

28. The method of claim 16, wherein the sealing edge is designed such that it terminates flush with the surface of at least one of the electrodes facing away from the membrane.

29. The method of claim 16, wherein the sealing edge is designed such that it projects beyond the surface of at least one of the electrodes facing away from the membrane.

30. The method of claim 16, further comprising the step of pretreating the portions of the electrodes and/or of the membrane on which sealing edge is to be formed before formation of the sealing edge.

31. The method of claim 30, wherein said pretreatment consists of wetting the portions of the electrode on which the sealing edge is to be formed with a solvent of the sealing agent.

32. The method of claim 30, wherein said pretreatment consists of milling portions of the surface of the electrode on which the sealing edge is to be formed.

33. The method of claim 30, wherein said pretreatment consists of partial oxidation of the portions of the carbon materials of the electrode on which the sealing edge is to be formed.

34. A method of making a membrane-electrode unit with an integrated sealing edge for a polymer electrolyte membrane fuel cell, comprising the following steps:

forming a membrane-electrode layer material made of an anode electrode and a cathode electrode with a polymer electrolyte membrane disposed therebetween;

severing a piece of the layer material in a size suitable for making a desired membrane-electrode unit, both surfaces of the membrane of said severed piece being covered substantially completely by the electrodes;

pretreating portions of the electrodes and/or of the membrane on which a sealing edge is to be formed before formation of the sealing edge; and forming the sealing edge around the periphery of said severed piece by at least one of having a sealing agent penetrate into an edge portion of at least one of the electrodes, the pores of the at least one electrode being filled substantially completely in said edge portion such that the sealing edge penetrates an edge portion of at least one of the electrodes and adheres to the portion of the membrane in contact with the edge portion, and by applying a sealing agent to the end face of at least one of the electrodes and to the end faces of the membrane such the sealing edge adheres to at least the end faces of said membrane; wherein said pretreatment consists in wetting the portions of the electrode on which the sealing edge is to be formed, with a solvent of the sealing agent.

35. A method of making a membrane-electrode unit with an integrated sealing edge for a polymer electrolyte membrane fuel cell, comprising the following steps:

forming a membrane-electrode layer material made of an anode electrode and a cathode electrode with a polymer electrolyte membrane disposed therebetween;

severing a piece of the layer material in a size suitable for making a desired membrane-electrode unit, both surfaces of the membrane of said severed piece being covered substantially completely by the electrodes;

pretreating portions of the electrodes and/or of the membrane on which a sealing edge is to be formed before formation of the sealing edge; and forming the sealing edge around the periphery of said severed piece by at least one of having a sealing agent penetrate into an edge portion of at least one of the electrodes, the pores of the at least one electrode being filled substantially completely in said edge portion such that the sealing edge penetrates an edge portion of at least one of the electrodes and adheres to the portion of the membrane in contact with the edge portion, and by applying a sealing agent to the end faces of at least one of the electrodes and to the end faces of the membrane such the sealing edge adheres to at least the end faces of said membrane; wherein said pretreatment consists of milling portions of the surface of the electrode on which the sealing edge is to be formed.

36. A method of making a membrane-electrode unit with an integrated sealing edge for a polymer electrolyte membrane fuel cell, comprising the following steps:

forming a membrane-electrode layer material made of an anode electrode and a cathode electrode with a polymer electrolyte membrane disposed therebetween;

severing a piece of the layer material in a size suitable for making a desired membrane-electrode unit, both surfaces of the membrane of said severed piece being covered substantially completely by the electrodes;

pretreating portions of the electrodes and/or of the membrane on which a sealing edge is to be formed before formation of the sealing edge; and forming a sealing edge around the periphery of said severed piece by at least one of having a sealing agent penetrate into an edge portion of at least one of the electrodes, the pores of the at least one electrode being filled substantially completely in said edge portion such that the sealing edge penetrates an edge portion of at least one of the electrodes and adheres to the portion of the membrane in contact with the edge portion, and by applying a sealing agent to the end face of at least one of the electrodes and to the end faces of the membrane such the sealing edge adheres to at least the end faces of said membrane; wherein said pretreatment consists of partial oxidation of the portions of the carbon materials of the electrode on which the sealing edge is to be formed.

* * * * *